United States Patent [19]

Doddington et al.

[11] Patent Number: 4,908,865
[45] Date of Patent: Mar. 13, 1990

[54] SPEAKER INDEPENDENT SPEECH RECOGNITION METHOD AND SYSTEM

[75] Inventors: George R. Doddington, Richardson, Tex.; Enrico Bocchieri, Dallas, Tex.

[73] Assignee: Texas Instruments Incorporated, Dallas, Tex.

[21] Appl. No.: 290,816

[22] Filed: Dec. 22, 1988

Related U.S. Application Data

[63] Continuation of Ser. No. 224,224, Jul. 22, 1988, abandoned, which is a continuation of Ser. No. 687,103, Dec. 27, 1984, abandoned.

[51] Int. Cl.$^4$ .............................................. G10L 5/00
[52] U.S. Cl. .................................... 381/43; 364/513.5
[58] Field of Search ................................... 381/29–53; 364/513.5

[56] References Cited

U.S. PATENT DOCUMENTS 4,544,919 10/1985 Gerson .................................. 381/41
4,625,287 11/1986 Matsuura et al. ..................... 381/43
4,677,672  6/1987 Ukita et al. ........................... 381/43

OTHER PUBLICATIONS

Pols, L., "Real-Time Recognition of Spoken Words", IEEE Transactions on Computers, vol. C-20, No. 9, pp. 972-978, 9/1971.
Sambur, M., et al., "A Statistical Decision Approach to the Recognition of Connected Digits", IEEE Transactions of Acoustics, Speech, and Signal Processing, vol. ASSP-24, No. 6, pp. 550-558, 12/1976.

Primary Examiner—Emanuel S. Kemeny
Attorney, Agent, or Firm—William E. Hiller; N. Rhys Merrett; Melvin Sharp

[57] ABSTRACT

Recognition of sound units is improved by comparing frame-pair feature vectors which helps compensate for context variations in the pronunciation of sound units. A plurality of reference frames are stored of reference feature vectors representing reference words. A linear predictive coder (10) generates a plurality of spectral feature vectors for each frame of the speech signals. A filter bank system (12) transforms the spectral feature vectors to filter bank representations. A principal feature vector transformer (14) transforms the filter bank representations to an identity matrix of transformed input feature vectors. A concatenate frame system (16) concatenates the input feature vectors of adjacent frames to form the feature vector of a frame-pair. A transformer (18) and a comparator (20) compute the likelihood that each input feature vector for a frame-pair was produced by each reference frame. This computation is performed individually and independently for each reference frame-pairs. A dynamic time warper (22) constructs an optimum time path through the input speech signals for each of the computed likelihoods. A high level decision logic (24) recognizes the input speech signals as one of the reference words in response to the computed likelihoods and the optimum time paths.

10 Claims, 2 Drawing Sheets

Microfiche Appendix Included
(1 Microfiche, 23 Pages)

SPEAKER INDEPENDENT SPEECH RECOGNITION METHOD AND SYSTEM

This application is a continuation of application Ser. No. 224,224, filed July 22, 1988, which is a continuation of application Ser. No. 687,103, filed 27 Dec. 1984, both now abandoned.

The appendices are in microfiche on one sheet showing 23 pages.

FIELD OF THE INVENTION

This invention relates to speech recognition and, more particularly, relates to a method and apparatus particularly adapted for speaker-independent speech recognition.

BACKGROUND OF THE INVENTION

Substantial effort has heretofore been exerted in developing speech recognition systems which are speaker-dependent or that require each user of the system to enroll his own voice in order to achieve acceptably high recognition performance. A more difficult task has been to develop a speaker-independent speech recognition system which will recognize a person's speech without that particular person being required to supply the system with samples of his speech prior to usage.

Previously developed speech recognition systems have attempted to achieve speaker independence by sampling speech data from a large number of speakers. These data are then either averaged together to form a single representative reference pattern for each word or the data are clustered into a variety of multiple reference patterns in which each pattern is supposed to represent a particular dialectical or acoustical manifestation of the word. Unfortunately, such prior approaches have been relatively ineffectual and have provided generally unacceptable speaker-independent speech recognition performance.

M. R. Sambur and L. R. Rabiner, in the article "A Speaker-Independent Digit-Recognition System," published in the Bell System Technical Journal, Volume 54, No. 1, January, 1975, disclosed an algorithm for speaker-independent recognition of isolated digit words by segmenting the unknown word into three regions and then making categorical judgments as to which of the six broad acoustic classes each segment falls. Digit verification is then provided, since each digit has unique categorical patterns. Preliminary experiments were conducted based on the same technique and a complex connected speech segmentation algorithm, as reported in the article "Some Preliminary Experiments in the Recognition of Connected Digits," IEEE Transactions, ASSP, April, 1976. However, such prior algorithm approaches have provided only moderate recognition rates.

More recently improved techniques have been disclosed utilizing algorithms which provide higher accuracy word recognition rates, such as disclosed in the articles "Application of Dynamic Time Warping to Connected Digit Recognition," by Rabiner and Schmidt, IEEE Trans, ASSP, August, 1980 and "Connected Digit Recognition Using a Level-Building DTW Algorithm," by Myers and Rabiner, IEEE Trans, ASSP, June, 1981. However, such techniques require relatively large numbers of reference templates for each word and require multiple passes of input data due to the relatively inefficient level building time registration techniques.

Previously developed speaker-independent recognition systems have, in general, neglected a fundamental problem which has created ineffective performance. This problem is the inadequacy of the measures of the speech data used to discriminate the basic sounds of speech. Measures which are normally used are typically derived from a frame-by-frame analysis of speech. For example, the speech may be modeled as a sequence of steady-state frames, with each frame covering about 20 milliseconds or about 50 frames per second, and the speech signal is represented by a sequence of speech features with one set of speech features being computed for each frame of speech data.

With such prior speech recognition techniques, speech discrimination is thus typically achieved by computing the Euclidean distance between corresponding frames of input and reference feature vectors. This has appeared to be an optimum statistical solution to the problem, assuming that (1) adjacent frames of the speech signal are uncorrelated and (2) the variability of the speech signals are independent of the word or sound which produces them. Unfortunately, both of these two assumptions are incorrect and have thus created inaccuracies and unreliability in previous speech recognition techniques. A need has thus arisen for a speech recognition technique which is not based upon the above-noted assumptions and which provides improved speaker-independent speech recognition.

SUMMARY OF THE INVENTION

The present invention provides a method and system for speech recognition which substantially minimizes or eliminates the disadvantages of previously developed speech recognition systems. In accordance with the invention, the feature vector for each frame of speech is defined to be the concatenation of the speech parameters for that frame and those from the previous frame. Thus, the dynamics of the speech signal are explicitly accommodated. Secondly, the variability of the speech features is explicitly calibrated individually for each reference frame of speech. This is accomplished by computing the covariance matrix of the feature vector individually for each reference frame. These covariance matrices are then used to transform the input speech feature vector independently for each reference frame so as to achieve an optimum discrimination between each reference word and sound.

In accordance with a more specific aspect of the invention, a method is provided for recognizing input speech signals organized into a sequence of frames which includes storing a plurality of reference frames of reference feature vectors representing reference words. A plurality of spectral feature vectors are generated by spectral analysis such as by linear predictive coding for each frame of the speech signals. The spectral feature vectors may then be transformed to a plurality of filter bank representations. The filter bank representations are then transformed to an identity matrix of transformed input feature vectors. The feature vectors of adjacent frames are then concatenated to form the feature vector of a frame-pair. The likelihood is then computed that each input feature vector for a frame-pair was produced by each of the reference frames. The computation is performed individually and independently for each of the reference frame-pairs. Dynamic time warping is then utilized to construct an optimum time path through the input speech signals for each of the computed likelihoods. The input speech signals are then recognized as one of the reference words in response to the computed likelihoods and the optimum time paths.

DESCRIPTION OF THE DRAWINGS

For a more complete understanding of the present invention and for other aspects and advantages thereof, reference is now made to the following description taken in conjunction with the accompanying drawing, in which.

DESCRIPTION OF THE PREFERRED EMBODIMENT

Figure 1:
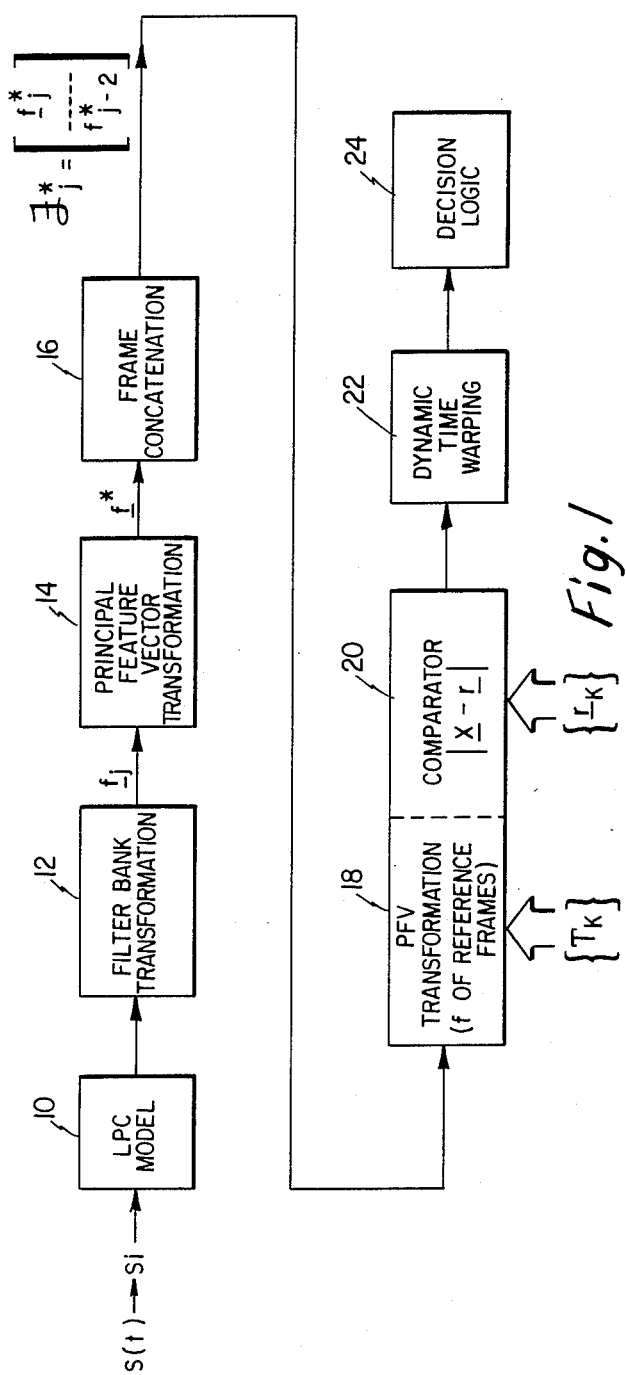
FIG. 1 illustrates a block diagram of a speech recognition system according to the invention.
Figure 2:
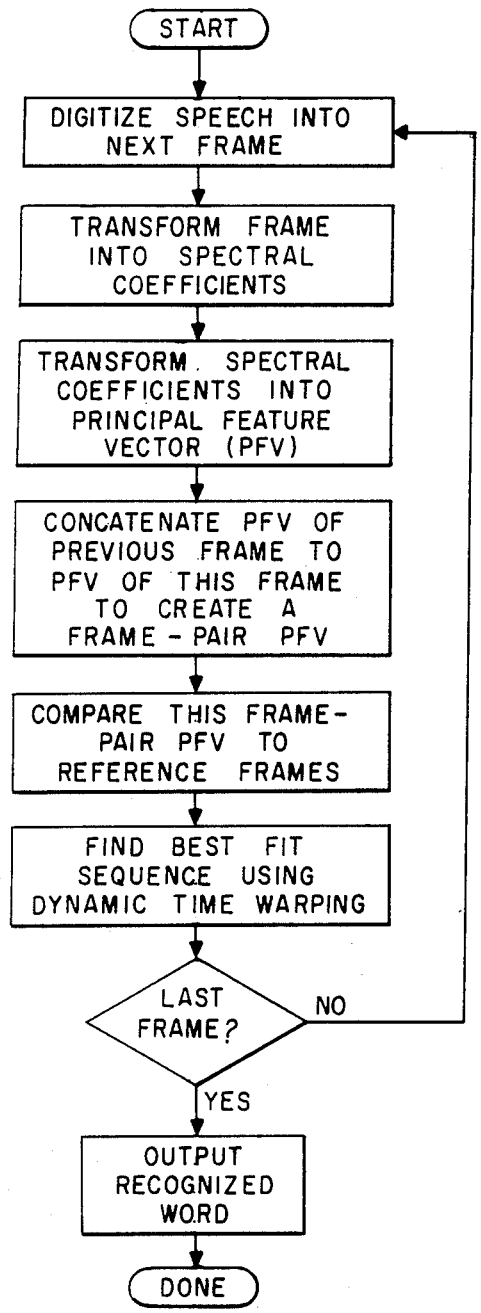
FIG. 2 is a processing flow chart.

FIG. 1 illustrates a system for accomplishing speech recognition in accordance with the present invention. Initially, a reference set of frames of feature vectors for reference words is stored for use with the system, as will be subsequently described. The input speech signal S(t) to be recognized by the system is digitized to signal S(i) and is applied to a linear predictive coding (LPC) model system 10. The LPC model 10 is the preferred embodiment for providing frame-wise analysis of the input signal analysis or characterizing a speech signal by feature vectors which are organized in time in groups. The Nth order LPC polynomial used by the invention models human speech as the output of a time-varying recursive N pole filter with periodic or random inputs and essentially operates as a filter with N poles and no zeros. A typical implementation provides 50 frames per second, or a 20 millisecond frame. Thus, the LPC model provides a set of feature vectors during each 20 millisecond frame, the set of feature vectors including the reflection coefficients of the LPC model, rms energy and pitch/voicing. In the preferred embodiment, a tenth order LPC model may be used and thus each signal is represented by a 12 element feature vector for each 20 millisecond frame when the ten reflection coefficients of the LPC model are considered. The LPC model is further described and explained in co-pending patent application Ser. No. 461,884, filed Jan. 28, 1983, now abandoned, and continued as Ser. No. 110,062, filed Oct. 13, 1987, and assigned to the present assignee.

The modeled signal is then applied to a filter bank transformer 12 which transforms the signal into spectral coefficients. The transformed speech signal is thereafter represented by a 16 element feature vector including rms energy, pitch/voicing and a 14 filter bank amplitude vector. The filter bank transformation makes the frame-by-frame dynamics and the coefficient interdependencies more explicit and easier to model by the system. An autocorrelation function is utilized to produce the filter bank transformation 12 and a program listing in FORTRAN language for implementing the transformation in a general purpose digital computer is attached herewith as Appendix A. The program listing of Appendix A is entitled RHO_to_FB and includes a data file that drives RHO to the filter bank transformation which is identified as Appendix B.

The conversion of the LPC model to a filter bank is termed principal component analysis (PCA) which provides spectral amplitude coefficients, termed principal spectral components (PSC). The filter bank transformer 12 in the preferred embodiment comprises a 14 element filter bank which thus provides the feature vector $f_j$ in dB amplitude as a function of frequency. In accordance with the invention, the spectral feature vector $f_j$ is thus statistically characterized and then a linear transformation of the spectral feature vector is based upon that characterization.

In one implementation of the invention, a spectral vector may be appended and associated with measured energy and voicing condition. This results in a spectral vector and overall dB energy, in combination with a pitch tracker to determine whether the speech frame is voiced or unvoiced (periodic or aperiodic).

The transformed spectral feature vectors $f_j$, whether they are 14 spectral amplitudes or 14 spectral amplitudes in combination with log energy and voicing, are applied to the principal feature vector transformer 14. This is an initial diagonalizing transformation which is performed on the feature vectors $f_j$. This transformation makes the global covariance matrix (covariance being measured over all reference frames) an identity matrix. This transformation is obtained by estimating the covariance matrix and determining the eigenvectors which may be represented as:

$$\Sigma = \mu' \Lambda \mu \quad (1)$$

The feature vector is then multiplied by aspects of the eigenvectors to provide the linear transformation set forth below:

$$f^* = \Lambda^{-\frac{1}{2}} \mu f \quad (2)$$

The principal feature vector transformation is described in greater detail in a FORTRAN program listing suitable for being run on a general purpose computer and attached herewith as Appendix C.

The transformation 14 is accomplished to enable subsequent computation of the likelihood function more easily. In addition, the technique provides a substantial increase in resolving power beyond what would be provided by solely a filter bank transformation. In the preferred embodiment of the invention, the computed eigenvalues are ranked in order of magnitude and only the ten highest are utilized in order to provide high resolution and to reduce noise. The reduction of the features by eliminating eigenvalues, in addition to eliminating noise, reduces the task of frame specific modeling. Further, the required numerical precision is reduced because subsequent frame-specific covariance matrices will be closer to identity matrices.

The feature vectors of adjacent frames are then concatenated to form the feature vector of a frame-pair at step 16 in the drawing. The dynamics of the speech signals are important and thus are explicitly characterized. The resulting concatenated data may be represented as $F^*_j$. For example, a series of feature vectors . . . $f_{j-2}, f_{j-1}, f_j, f_{j+1}, f_{j+2}$ . . . of length n will be concatenated to form a series of frame-pair feature vectors . . . $F_{j-2}, F_{j-1}, F_j, F_{j+1}, F_{j+2}$ of length 2n, wherein $$F_j 2n \times 1 = \frac{f_{j-1} n \times 1}{f_{j+1} n \times 1}$$

The concatenated frames 16 are then applied to the principal vector transformer 18 and comparator 20 wherein the likelihood is computed that the input feature vector was produced by each reference frame for each transformed input feature vector. The previously stored reference data are utilized in this computation process. The computation is performed individually and independently for each feature vector and each stored reference frame. The computation is accomplished by multiplying the transformed input feature vector by a matrix representing the statistical distribution of the feature vector under the hypothesis that a particular reference frame produced it. This requires a substantial computation for each frame due to the large number of statistical distributions. In the iterative process, the comparator 20 computes the Euclidean distance according to:

$$d_{kj} = x_{kj} - r_k \quad (3)$$

wherein $x_{kj} = T_k F_j$ (4)

The Euclidean distance calculation, in combination with the transformation, results in a large number of computations, and thus, if desired, a single transformation may serve to represent many different reference frames. This may be achieved by clustering together those covariance matrices with small specified divergencies. For more detail of the transformation made and comparison provided by transformer 18 and comparator 20 in the Figure, reference is made to the attached FORTRAN program listing of Appendix D.

As may be seen in the program listing, the computation is provided by multiplying a matrix, subtracting a vector and summing the squares to produce a scalar result.

A dynamic time warping system 22, using the likelihoods produced in steps 18 and 20, constructs optimum time paths through the input data for each computed reference word hypothesis. At this stage, statistical independence of the frames is assumed. However, time dependencies have already been incorporated into the feature vector definition and thus, the input likelihood measures assist to avoid any deleterious aspects of this assumption. For more detailed description of the dynamic time warper 22, reference is made to the FORTRAN program listing attached hereto as Appendix E.

The dynamic time warping system determines the lowest error cumulative path which provides an optimally time-aligned vector hypothesis for use by high level signal decision logic 24 which operates by utilizing conventional decision-making techniques to determine whether or not to declare a word as being recognized. A description of dynamic time warping and decision logic may be found in co-pending patent application Ser. No. 461,844, filed Jan. 28, 1983, now abandoned, and continued as Ser. No. 110,062, filed Oct. 13, 1987, and assigned to the present assignee and incorporated herein by reference. As an example of the decision logic, if the highest likelihood word has a high enough specified likelihood, and if this likelihood is significantly greater than the next best word, this word would be declared as recognized.

The present technique allows the use of a smaller number of reference templates per word (one or two) as contrasted with the large number of templates required by previously defined prior techniques, thereby allowing more efficient use of computer resources.

The present invention may also be used in speaker-dependent recognition. The present invention includes the discrimination of speech sounds based upon their phonetic quality. Therefore, such discrimination may be used to improve the performance of speaker-dependent speech recognition. This may be accomplished by retaining the two key aspects of the invention, namely the frame-pair feature definition and the frame-specific transformation, which is speaker independent, and then by modifying the reference data to be speaker-dependent rather than speaker-independent.

In order to define the necessary word-specific probabilistic reference data models for use in the invention, a dialectically balanced, sex balanced, large data base consisting of 27,720 digit sequences (the length of the sequences ranging from one digit to seven digits, spoken by 360 speakers from 20 dialect areas) was collected. In order to derive a truly speaker-independent recognition algorithm, this data base was subdivided into a training set and a test set in which there was no overlap of speakers. The training tokens contained data selected from equal numbers of male speakers and female speakers, and from equal numbers of speakers from each dialect region. With the use of the present invention, dynamic time warping with no end-point constraint was utilized to allow the test sequence to be optimally time aligned with the templates more efficiently. A test of the invention utilizing the above-noted reference data base resulted in approximately 2.8% digit substitution rate, 2.3% digit deletion rate and 0.8% digit insertion rate (weighted by the total number of digits). For the subset of isolated digits, a substitution error of less than 0.6% was measured.

The present invention may be particularly utilized in speaker-independent recognition of connected speech, with a finite vocabulary such as digits. The invention provides a technology base for the development of reliable natural voice input for executive voice terminals, voice entry control, direct voice input to computers and the like.

Although the preferred embodiment of the invention has been described in detail, it should be understood that various changes, substitutions and alterations can be made therein without departing from the spirit of the invention as defined by the appended claims.

What is claimed is:

1. A method of recognizing input speech signals organized into a sequence of frames comprising:
    storing a plurality of reference frames of reference feature vectors representing reference words;
    generating a spectral feature vector for each frame of said speech signals;
    concatenating said spectral feature vectors of adjacent frames to form frame-pair feature vectors;
    transforming said frame-pair feature vectors so that the covariance matrix of said transformed frame-pair feature vectors is an identity matrix;
    computing the likelihood that each transformed frame-pair feature vector was produced by each said reference frame, said computation performed individually and independently for each said reference frame;
    constructing an optimum time path through said input speech signals as represented by the frame-pair feature vectors for each of said computed likelihoods; and
    recognizing said input speech signals as one of said reference words in response to said computed likelihoods and said optimum time paths.

2. A method as set forth in claim 1, wherein the generation of a spectral feature vector includes:
    initially analyzing each frame of said speech signals by linear predictive coding to provide a linear predictive coding model comprising a plurality of spectral linear predictive coding parameters defining a spectral parameter vector for each frame of said speech signals; and thereafter generating said spectral feature vector from said spectral parameter vector for each frame of said speech signals.

3. A method as set forth in claim 2, wherein the generation of a spectral feature vector further includes:

transforming said plurality of spectral linear predictive coding parameters to filter bank representations in defining said spectral parameter vector for each frame of said speech signals prior to the generation of said spectral feature vector from said spectral parameter vector for each frame of said speech signals.

4. The method of claim 1 wherein said step of computing the likelihood comprises:

multiplying each said transformed frame-pair feature vector by a matrix representing the statistical distribution of said transformed frame-pair feature vector under the hypothesis that a particular reference frame produced each transformed frame-pair feature vector.

5. The method of claim 1 wherein said step of constructing is performed by dynamic time warping.

6. The method of claim 3 wherein said step of transforming said frame-pair feature vectors includes:

estimating the covariance matrix of said frame-pair feature vectors and decomposing the resulting matrix to eigenvalues; and eliminating selected ones of said eigenvalues to reduce noise.

7. Apparatus for recognizing input speech signals organized into a sequence of frames comprising:

means for storing a plurality of reference frames of reference feature vectors representing reference words;

means for generating a spectral feature vector for each frame of said speech signals;

means for concatenating said spectral feature vectors of adjacent frames to form frame-pair feature vectors;

means for transforming said frame-pair feature vectors so that the covariance matrix of said transformed frame-pair feature vectors is an identity matrix;

means for computing the likelihood that each frame-pair feature vector was produced by each said reference frame, said computation performed individually and independently for each said reference frame;

means for constructing an optimum time path through said input speech signals as represented by the frame-pair feature vectors for each of said computed likelihoods; and means for recognizing said input speech signals as one of said reference words in response to said computed likelihoods and said optimum time paths.

8. The apparatus of claim 7 wherein said means for transforming said frame-pair feature vectors includes:

means for estimating the covariance matrix of said frame-pair feature vectors and decomposing the resulting matrix to eigenvalues; and means for eliminating selected ones of said eigenvalues to reduce noise.

9. The apparatus of claim 7 wherein said means for computing the likelihood comprises:

means for multiplying each said transformed frame-pair feature vector by a matrix representing the statistical distribution of said transformed frame-pair feature vector under the hypothesis that a particular reference frame produced each transformed frame-pair feature vector.

10. The apparatus of claim 7 wherein said means for constructing comprises dynamic time warping means.

* * * * *